INVENTORS
THIJS deHAAS
MARTIN B. GRAY
CHARLES E. PERKETT
BY
ATTORNEY

INVENTORS
THIJS deHAAS
MARTIN B. GRAY
CHARLES E. PERKETT
BY
ATTORNEY

INVENTORS
THIJS de HAAS
MARTIN B. GRAY
CHARLES E. PERKETT
BY
ATTORNEY

INVENTORS
THIJS deHAAS
MARTIN B. GRAY
CHARLES E. PERKETT
BY
[signature]
ATTORNEY 3,445,593

RECEIVER FOR INFORMATION REPRESENTED BY DIFFERENTIAL PHASE SHIFT BETWEEN DIFFERENT FREQUENCY TONES

Martin B. Gray and Thijs de Haas, Rochester, and Charles E. Perkett, Penfield, N.Y., assignors to General Dynamics Corporation, a corporation of Delaware Filed May 2, 1966, Ser. No. 546,896
Int. Cl. H04l 27/24; H03k 9/06; H04b 1/40
U.S. Cl. 178—67 10 Claims

ABSTRACT OF THE DISCLOSURE

A phase modulation recovery system for frequency differential phase shift keyed information is disclosed wherein a modulated tone centrally located in frequency with respect to other tones has its phase information translated to a processing signal. This processing signal is also used as a reference in decision logic to derive the phase information directly in digital form.

The present invention relates to communications systems, and particularly to systems for communicating digital information between a transmitting point and a receiving point.

The invention is especially suitable for use in phase shift keyed communications systems in which successive signal elements are shifted in phase and the phase shift thereof represents the information or symbol being transmitted. The invention will be found particularly useful in frequency differential phase shift keyed communication systems of the type described in Patent No. 3,036,157 issued on May 22, 1963, to G. A. Franco and G. Lachs, and in the type of such frequency differential phase shift keyed communications systems in which information is transmitted in terms of progressive phase shifts between tones which are adjacent to each other in frequency. This invention is generally applicable to the detection or demodulation of multiplexed phase modulated tones.

A plurality of phase shifted information tones, such as multiplexed tones, are usually transmitted with a particular phase alignment therebetween, altered, of course, by the modulation. When such tones are received, the initial alignment must be preserved in order to prevent misalignments from being mistaken by the detection circuitry as phase information, which upon detection manifests itself as errors. In order to preclude such errors, circuit complexities are often times introduced into the receiver portion of the communication systems, and sometimes even into the transmitter portion thereof. Circuits for deriving from the phase angle of the tones the information carried thereby also lends itself to complexity, particularly when preservation of the phase shift information throughout the detection process is required.

Accordingly, it is an object of the present invention to provide an improved communication system for handling a plurality of tones which conveys the information and which provides accurate demodulation of such tones without introducing circuit complexity.

It is a further object of the present invention to provide an improved communications system which utilizes phase shifted information tones for the transmission of information in which the need for phase adjustments and compensation is reduced.

It is a still further object of the present invention to provide an improved communication system in which phase shifted information tones are handled and which has a greater stability and less circuit complexity than systems of this type which were heretofore available.

It is a still further object of the present invention to provide an improved frequency differential phase shift keyed communication system having an improved demodulation and information extraction circuitry.

It is a still further object of the present invention to provide an improved frequency differential phase shift keyed communication system which is especially suitable to diversity combining.

It is a still further object of the present invention to provide an improved frequency differential phase shift keyed communication system having decision logic for determination of the value of digital data which is transmitted, which logic is simpler and more reliable than logic of this type which has been heretofore available.

Briefly described, a communications system embodying the invention includes a transmitter portion which provides a plurality of tones, the phase relationship between different ones of which is modulated in accordance with the information being transmitted. Each symbol or item of information which is transmitted is represented by the phase state of different ones of the tones during successive intervals of time. These time intervals may therefore be termed symbol intervals. The tones may be transmitted from the transmitting point to a receiving point by way of a communications link, such as a high frequency radio path. A receiver located at the receiving point is responsive to the transmitted tones and derives outputs which are functions of the phase modulation thereof. The information itself, may be represented by the differential phase shift between tones of different frequency; for example, between tones which are adjacent to each other in frequency. The outputs which correspond to the phase modulation of one of the information tones, say one centrally disposed in frequency with respect to two other tones, is translated into phase modulation of a locally generated processing frequency signal. Modulators responsive to the outputs which are derived from the other information tones and which correspond to the phase modulation thereof are modulated by means of the phase modulated processing frequency signal so as to derive outputs at the processing frequency which are phase modulated in accordance with the differential phase shift between the information tones.

By comparing the unmodulated processing signal with the outputs due to the various information tones, the differential phase shift information may be derived. This phase shift information may correspond to differently valued bits of digital information in accordance with the magnitude of such phase shift. Accordingly, phase shift responsive decision logic circuits may be used to derive the information. The invention also may include synchronizing circuits responsive to the average value of the phase shift interposed on the tones for providing an unmodulated processing frequency signal from which the information may be derived by the phase shift responsive logic circuits.

The invention itself, both as to its organiaztion and method of operation, as well as additional objects and advantages thereof will become more readily apparent from a reading of the following description in connection with the accompanying drawings in which.

Figure 1:
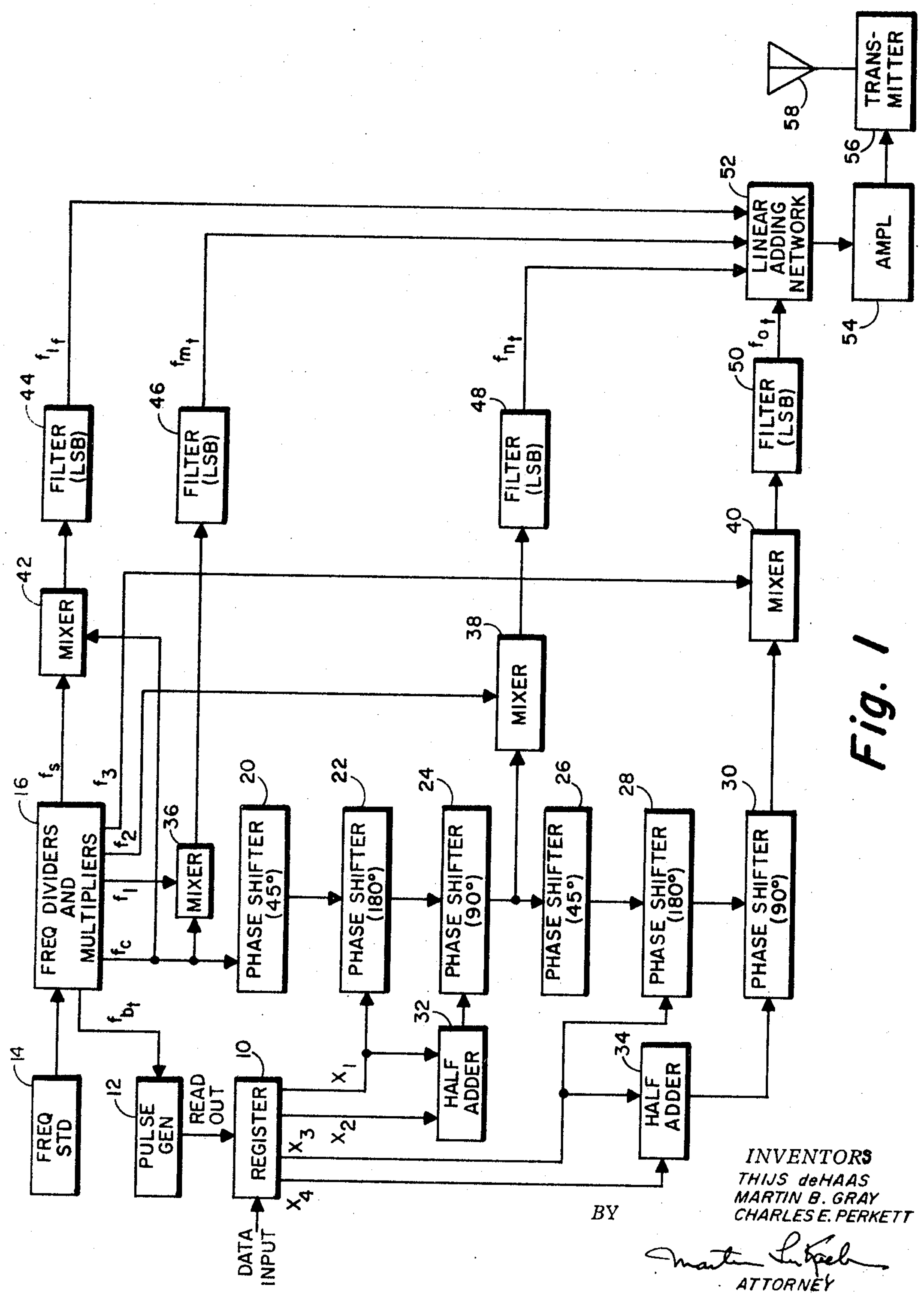
FIG. 1 is a simplified block diagram of the transmitter portion of a system embodying the invention.

Referring more particularly to FIG. 1, there is shown a register 10, in which a plurality of bits of digital data as may arrive serially from a data input line may be stored. Four bits which are available in parallel in the output stages of the register 10 are indicated as $X_1$, $X_2$, $X_3$ and $X_4$. The register 10 may be a shift register from which these last four bits are read out in response to a readout pulse. While only four bits are indicated, a much larger number of bits may be simultaneously transmitted by a system embodying the invention.

The readout pulses are generated by a pulse generator 12 which provides repetitive pulses at a given frequency, the period of which is equal to the symbol interval during which a plurality of bits is transmitted. A suitable given frequency may be 25 c./s. This frequency is indicated generally as $f_{bt}$ and is the time base of the system. $f_{bt}$ is derived from a frequency standard 14, which may be a crystal controlled oscillator. The output of this standard 14 is applied to frequency dividers and multipliers 16, which may include tandem connected flip-flop circuits as well as non-linear multiplier circuits of the type known in the art. In addition to the signal of frequency $f_{bt}$, the circuits 16 provide signals of other frequencies $f_c$, $f_1$, $f_2$, $f_3$ and $f_s$. $f_c$ may be a frequency which is a few orders of magnitude higher than $f_{bt}$ and may be a multiple of the frequency $f_{bt}$, as may conveniently be provided by the circuit 16. $f_c$ may suitably be 1000 c./s. or the fortieth harmonic of $f_{bt}$. $f_s$ may be a frequency in a range suitable for application to the input of a radio transmitter, line modulator or other multiplex unit.

The relationship between the signals so far described may be represented by the following equations:

$$f_s = nf_{bt}, \text{ where } n \text{ is an integer} \quad (1)$$
$$f_1 = f_s + f_{bt} \quad (2)$$
$$f_2 = f_s + 2f_{bt} \quad (3)$$
$$f_3 = f_s + 3f_{bt} \quad (4)$$

Since all of the frequencies involved are related to $f_{bt}$, a discrete number of cycles or half cycles thereof can occur in the symbol interval and improves correlation detection in the receiver portion of the system to be described hereinafter.

The information is transmitted on the basis of quadrinary, phase shift keying by means of a plurality of phase shifters 20, 22, 24, 26, 28 and 30, which are connected in tandem and through which the signal of frequency $f_c$ passes and is progressively phase shifted. The phase shift keyers 20 and 26 may be resistor-capacitor networks which provide a phase shift of 45° ($\pi/4$ radians). The phase shifters 22 and 28 may be amplifiers having one stage which preferably provides zero gain and which may be electronically switched into and out of the phase shifter chain, respectively when the bit applied thereto is a binary "1" bit and a binary "0" bit. These amplifiers are invertor amplifiers and provide a 180° ($\pi$ radians) phase shifted when interposed in the chain in response to the binary "1" bit input thereto. The phase shifters 24 and 30 may similarly be amplifier circuits having resistor capacitor networks which provide 90° ($\pi/2$ radians) phase shift when these stages are switched into the chain of phase shifter circuits. A phase shift of 90° is interposed by these circuits 24 and 30 in response to an input representing a binary "1" bit. The stages 24 and 30 are electrically short circuited in response to a binary "0" bit. Digital signal operated electronic switching for connecting and disconnecting stages from a circuit are well known in the art and are, therefore, not described in detail herein. Of course, other types of digitally-operated phase shifter circuits may be used. For example, $f_c$ may be generated in all of its eight possible phases and gates provided to select the desired phases in accordance with the digital signals which are provided.

The $X_1$ and $X_3$ bits provide the digital signals which control the 180° phase shifters 22 and 28, respectively. The 90° phase shifters 24 and 30 are controlled by digital signal outputs from modulo two adding circuits, such as half adders 32 and 34. The half adder 32 provides the modulo two sum of the $X_1$ and $X_2$ bits. The half adder 34 provides the modulo two sum of the $X_3$ and $X_4$ bits.

The phase difference between tones adjacent to each other in frequency is used to represent two bits. This phase difference may be represented as $\Delta\theta_k$, $\Delta\theta_{k-1}$ . . . These angles are coded into any of four phase positions; namely 45°, 135°, 225° and 315°, corresponding to the respective values of adjacent bits of 00; 01; 11; and 10.

Figure 2:
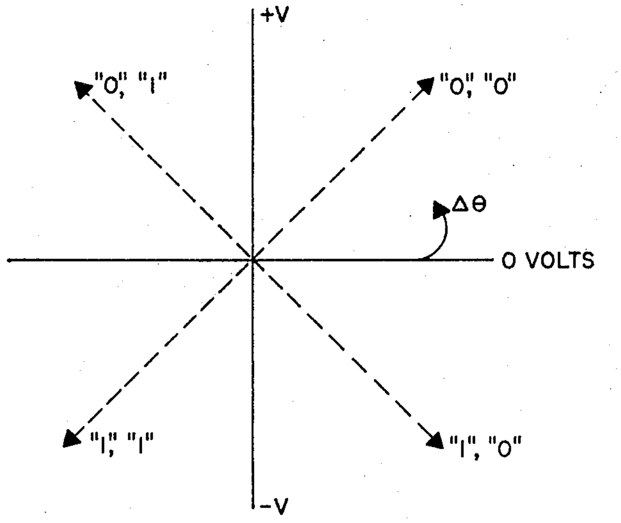
FIG. 2 is a diagram illustrating the phase coding of digital information in the transmitter portion of FIG. 1.

FIG. 2 graphically represents the above-described phase coded relationship. This relationship may be expressed by the following equation which represents the absolute phase of the signal in the output of the phase shifter 30:

$$\theta_k = [\theta_{k-1} + \pi/4 + (X_4 \oplus X_3)\pi/2 + X_3\pi] \quad (5)$$

The phase angle of the signal emanating from the phase shifter 24 may be represented by the following equation:

$$\theta_{k-1} + [\pi/4 + (X_2 \oplus X_1)\pi/2 + X_1\pi] \quad (6)$$

It will be appreciated that through the use of additional groups of phase shifters as would include 45°, 90° and 180° shifters similar to shifters 26, 28, 30, additional pairs of bits may be simultaneously coded and transmitted with the bits $X_1$ through $X_4$, during each symbol interval.

Mixers 36, 38, 40 and 42 are provided for heterodyning the signals of frequency $f_c$ and the outputs of the phase shifters 24 and 30 into tones which are separated by the time base frequency $f_{bt}$. The lower sideband outputs of these mixers 36, 38, 40 and 42 are passed by means of filters 44, 46, 48 and 50 to a linear adding network 52 which combines these signals and applies them to a transmitter 56 after amplification in an amplifier 54. The combined signals are transmitted by a transmitter 56 which may be a high frequency radio transmitter which propagates the signals by way of an antenna 58 over a radio link to a receiving point. Although lower sideband signals are utilized, upper sideband rather than lower sideband products may be used. In the event that the sideband products are in a range removed from the other mixer product frequencies, a single filter immediately ahead of the amplifier 54 may be used to remove all but the desired sideband products. The tones which are transmitted are indicated as $f_{lt}$, $f_{mt}$, $f_{nt}$ and $f_{ot}$. These tones are separated by the time base frequency $f_{bt}$, as will be apparent from the following equations which define their frequencies:

$$f_{lt} = f_s - f_c \quad (7)$$
$$f_{mt} = f_{lt} + f_{bt} \quad (8)$$
$$f_{nt} = f_{lt} + 2f_{bt} \quad (9)$$
$$f_{ot} = f_{lt} + 3f_{bt} \quad (10)$$

The combined signal which is presented to the transmitter for transmission may be represented as:

$$s(t) = \sum_{v} A_v \sin(\omega_v t + \phi_v) \quad (11)$$

Where $A_v$ is the amplitude of each signal tone, $\omega_v$ is the angular frequency of each tone and $\phi_v$ is the phase angle of each tone.

Figure 3:
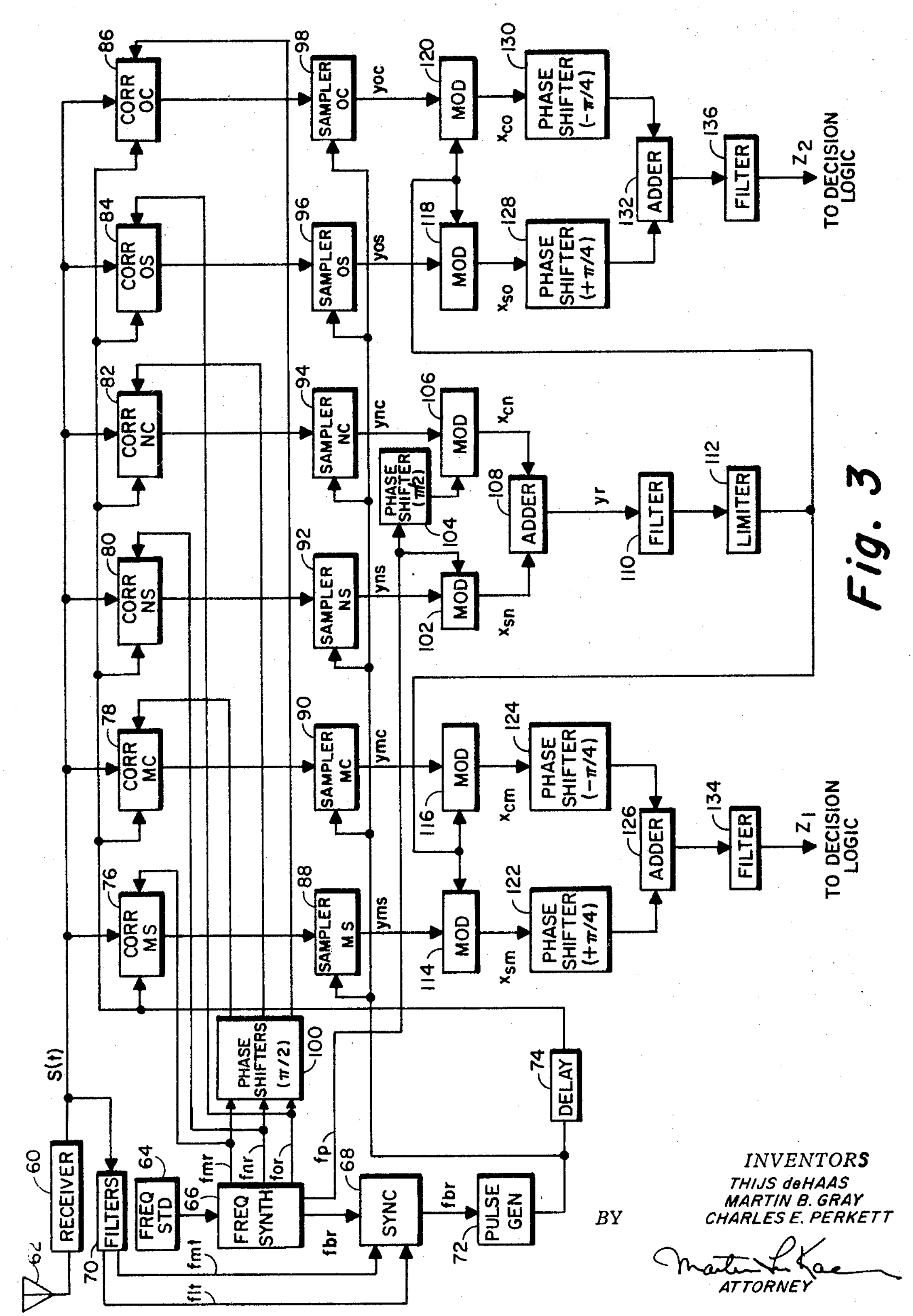
FIG. 3 is a simplified block diagram of a part of the receiver portion of the system embodying the invention.

In the receiving portion of the system which is illustrated in FIG. 3, receiver 60 derives signals which are transmitted by the transmitter 56 (FIG. 1). The receiver 60 may be a high frequency communications receiver which is connected to an antenna 62. The total incoming signal at the output of the receiver 60, $s(t)$ contains all of the tones which are transmitted over the radio line;

viz, $f_{lt}$, $f_{mt}$, $f_{nt}$ and $f_{ot}$. These tones may be represented individually by the following expressions:

$$s_{ot}=A_{ot}\sin(\omega_{ot}t+\theta_k) \quad (12)$$
$$s_{nt}=A_{nt}\sin(\omega_{nt}t+\theta_{k-1}) \quad (13)$$
$$s_{mt}=A_{mt}\sin(\omega_{mt}t+\theta_{k-2}) \quad (14)$$

The incoming tone at frequency $s_{lt}$, and the incoming tone at frequency $f_{mt}$ are both unmodulated and are used for time base synchronization purposes, as will appear shortly.

A frequency standard 64, which may be similar to the frequency standard 14 (FIG. 1) provides signals to a frequency synthesizer 66, which may be similar to the frequency divider and multiplier circuit 16 (FIG. 1) and generates a plurality of signals having the same frequencies as those generated in the circuits 16. These signals are designated as $f_{mr}$, $f_{nr}$ and $f_{or}$. Another signal, having a frequency $f_{br}$ is generated by the synthesizer 66. $f_{br}$ is equal to $f_{bt}$, which is generated in the transmitter portion of the system.

It is desirable that the symbol interval during reception be the same as the symbol interval during transmission. To this end, a synchronizing system 68 is provided. The receiver generated frequency $f_{br}$ and the received transmitted tones $f_{mt}$ and $f_{lt}$, which are extracted from the total incoming signal $s(t)$ by means of filter circuits 70, are applied to the synchronizing system 68. This system 68 may include mixer circuits which heterodyne the tones $f_{mt}$ and $f_{lt}$ with each other to provide an output having the difference frequency therebetween ($f_{bt}$). A phase locked loop, as may include a variable frequency oscillator and a phase detector for controlling the frequency thereof, may also be provided in the synthesizing system 68. This oscillator may have a nominal frequency of $f_{br}$ or 25 c./s. The output of the oscillator is compared in the phase detector with the output of the mixer to provide an error signal in accordance with the phase difference between $f_{br}$ and $f_{bt}$. The phase locked loop oscillator is therefore phase locked by this error signal so that $f_{br}$ is phase locked with $f_{bt}$. Accordingly, the receiver symbol interval and the transmitter symbol interval will be synchronized with each other.

A pulse generator 72 shapes the synchronizing system output signal $f_{br}$ into a short pulse which occurs at the end of the symbol interval, for example, the pulse may terminate at the positive-going, zero cross-over of the signal $f_{br}$. The output of the pulse generator 72 is applied to a delay circuit 74 which provides a short pulse which occurs at the beginning of each symbol interval. It may be desirable to combine the pulse generator 72 and the delay circuit 74 into a single circuit which provides a pulse, occurring during the positive-going zero cross-over of the signal $f_{br}$. The leading edge of this pulse will occur just before the end of the symbol interval, and the trailing edge of this pulse will occur just at the beginning of the next symbol interval. Pulses generated in response to this trailing edge and this leading edge may then be used instead of the output pulse of the pulse generator 72 and the delay circuit 74, respectively.

As was noted in the discussion of the transmitter portion of the system, the information is transmitted in terms of the phase difference between the transmitted tones which are adjacent to each other in frequency. The transmitted tones may be shifted during propagation over the radio link, due, for example, for multipath and fading. The filters in the receiver 60, as well as transmitter 56, through which these tones pass, may also cause them to be phase shifted, thus resulting in a phase shift of the individual tones, as well as in crosstalk distortion, which was discussed above. For example, the tone $s_{ot}$ may, on reception, be represented by the following equation:

$$s_{ot(r)}=A_{ot}\sin(\omega_{ct}t+\phi_k) \quad (15)$$

The new phase angle $\phi_k$ and $\phi_{k-1}$ include propagation and other phase shifts and may be represented as:

$$\phi_k=\theta_k-A_k;\ \phi_{k-1}=\theta_{k-1}-A_{k-1} \quad (16)$$

where $A_k$ represent these phase shifts. As was explained above, the differential phase shift between the received information tones which are adjacent to each other in frequency, such phase differential being defined with respect to the system time base, represents the transmitted information. The phase difference between the tones $s_{ot}$ and $s_{nt}$ may be derived from the absolute phase angles of these tones in accordance with the relationship:

$$\Delta\phi_k=(\phi_k-\phi_{k-1}) \quad (17)$$

where $\Delta\phi_k$ is the phase difference between the tones $s_{ot}$ and $s_{nt}$ and $\phi_k$ and $\phi_{k-1}$ are the absolute phase angles of these tones during a symbol interval. The propagation shift $A_k$ of the signal $s_{ot}$ is essentially equal to the propagation phase shift $A_{k-1}$ of the signal $s_{nt}$ because of their close frequency spacing (see Equation 16). The phase difference angle $\Delta\phi_k$ is therefore equal to the difference between phase angles of the tones $s_{ot}$ and $s_{nt}$ as received, which is also equal to the phase difference between the tones as transmitted. In other words:

$$\Delta\phi_k=\Delta\theta_k \quad (18)$$

Accordingly, the information may be derived from the difference angle $\Delta\phi_k$ alone.

A plurality of correlator circuits 76, 78, 80, 82, 84 and 86 are provided. A sampler 88 is associated with the correlator 76 and is connected to receive the output thereof. The correlator 76 and the sampler 88 together provide the output $y_{ms}$ which is a function of the cosine of the phase angle $\phi_{k-2}$ of the $s_{mt}$ tone (see Equation 14). Accordingly, the correlator 76 and the sampler 88 are both labeled MS.

The correlators 78, 80, 82, 84 and 86 are output connected to samplers 90, 92, 94, 96 and 98, respectively. These correlators and samplers are labeled MC, NS, NC, OS and OC to indicate by the first letter the frequency of the signal which is correlated (viz, $f_{mt}$, $f_{nt}$ or $f_{ot}$) and by the second letter the type of correlator, whether cosine or sine. The outputs of the samplers are indicated as $y_{mc}$, $y_{ns}$, $y_{nc}$, $y_{os}$ and $y_{oc}$. The received signal $s(t)$ is applied to one input of the correlators and signals of frequency $f_{mr}$, $f_{nr}$ and $f_{or}$ from the frequency synthesizer 66 are applied to the sine correlators 76, 80 and 84 for the tones of corresponding frequency. Phase shifters 100 are provided to phase shift these tones by 90°. The phase shifted tones are applied to the cosine correlators 78, 82 and 86.

The correlator circuits may be of the type which multiply and integrate the signals applied thereto. The integrator may be an RC integrating circuit which follows the multiplier. This integrator is reset, as by discharging the capacitor thereof, at the beginning of each symbol interval, by means of the output pulse from the delay circuit 74. To this end, diodes may be connected across the capacitor and biased in the forward direction by the pulse from the delay circuit 74. A pair of diodes polarized in opposite directions may be used to insure that the capacitors in the correlators are discharged, notwithstanding the polarity to which they are charged during a sympol interval.

The samplers 88, 90, 92, 94, 96 and 98 are operated by the pulse from the pulse generator 72 which occurs at the end of each symbol interval for detecting the output of the correlator at the end of each correlation interval. These samplers may be analog gate circuits which are enabled by the output pulse from the generator 72. For example, for the $s_{nt}$ tone, the correlator 80 provides an output which may be respresented by the following expression:

$$\int_0^T s(t)\sin(2\pi f_{nt})dt$$

where T is the receiver time base (viz, $l/f_{br}$). The correlator 82 to which the cosine of the locally generated signal $f_{nr}$ is applied performs the correlation operation expressed in the following expression:

$$\int_0^T s(t)\cos(2\pi f_{nt})dt \qquad (20)$$

The sampler 92 passes the signal $y_{ns}$ and the sampler 94 passes the signal $y_{nc}$ which can be represented by the following equations:

$$y_{ns}=A_n \cos \phi_{k-1} \qquad (21)$$

$$y_{nc}=A_n \sin \phi_{k-1} \qquad (22)$$

The other samplers 88, 90, 96 and 98 provide similar outputs which, of course, are sine and cosine functions of the phase of the signal tones which are correlated in their associated correlators 76, 78, 84 and 86.

The frequency differential phase modulation between the adjacent tones is recovered by means of the system of circuits which handle the outputs $y_{ms}$, $y_{mc}$, $y_{ns}$, $y_{nc}$, $y_{os}$ and $y_{oc}$. This system also utilizes a locally generated processing signal of frequency $f_p$. This frequency $f_p$ may be also expressed in terms of radians per second as $\omega_p$. The synthesizer 66 derives this frequency $f_p$ from the frequency standard 64 and the frequency is desirably a harmonic of the signal element or time base frequency $f_{br}$ which, since it is derived from the same source, is in synchronism therewith. $f_p$ is suitably a much higher frequency than the frequency of the information tones ($f_{mt}$ through $f_{ot}$). In the case where the signal tones may be approximately 1,000 c./s., $f_p$ may suitably be 10 kc./s.

A signal corresponding to the sine of this processing signal $f_p$ is applied to a modulator 102 which also receives the output $y_{ns}$. A signal corresponding to the cosine of the processing signal, by virtue of being phase shifted in a 90° phase shifter 104, is applied to the modulator 106 which also receives the output $y_{nc}$. It will be noted that the processing signal $f_p$ is used to modulate the tone $f_{nt}$ which is of the frequency centrally disposed between the other information tones $f_{mt}$ and $f_{ot}$. In the event that additional tones are transmitted, such as another pair of tones of frequencies successively higher than the frequency $f_{ot}$, the sampler output due to correlation of the tone of higher frequency adjacent to $f_{ot}$ will modulate the processing signal. The recovery circuitry which receives the $y_{os}$ and $y_{oc}$ outputs will also be duplicated so that the processing frequency signal modulated by the correlator output due to the higher frequency tone can be independently modulated by that modulated processing signal.

The modulator 102 provides an output $X_{sn}$ while the modulator 106 provides an output $X_{cn}$. These outputs may be represented by the following equations:

$$X_{sn}=A_n \cos \phi_{k-1} \sin \omega_p t = \frac{A_n}{2}[\sin(\omega_p t+\phi_{k-1})+\sin(\omega_p t-\phi_{k-1})] \qquad (23)$$

$$X_{cm}=A_n \sin \phi_{k-1} \cos \omega_p t = \frac{A_n}{2}[\sin(\omega_p t+\phi_{k-1})-\sin(\omega_p t\phi_{k-1})] \qquad (24)$$

The modulators themselves may be unbalanced modulator circuits such as chopper circuits wherein the outputs from the samplers are chopped at the processing frequency $f_p$, thereby effectively translating the outputs $y_{ns}$ and $y_{nc}$ to the processing frequency, but preserving the phase information thereof. The outputs of modulators are added in the linear adding circuit 108 which provides the output $y_r$. This output is equal to the sum of Equations 23 and 24 and may be expresed as:

$$y_r=A_n \sin(\omega_p t+\phi_{k-1}) \qquad (25)$$

The adder 108 output is a signal at the processing frequency which is a function of the phase of the $S_{nt}$ information tone. In effect, both the amplitude and phase relative to the receiver time base of the $f_{nt}$ signal is transferred onto the locally generated processing frequency $f_p$.

The output $y_r$ is then filtered in a bandpass filter 110 to remove any spurious frequency components and is passed through a limiter 112. The limiter provides a square wave signal of fixed amplitude which contains only the phase information (viz. $\phi_{k-1}$). This signal is used to drive modulators 114, 116, 118 and 120 in the phase modulation recovery system. The latter modulators may be similar to the modulators 102 and 106. The modulator 114 provides an output $X_{sm}$ which may be represented by the following equations:

$$X_{sm}=A_m \cos \phi_{k-2} \sin(\omega_p t+\phi_{k-1}) \qquad (26)$$

$$X_{sm}=\frac{A_m}{2}[\sin(\omega_p t+\phi_{k-1}+\phi_{k-2})+\sin(\omega_p t+\phi_{k-1}-\phi_{k-2})] \qquad (27)$$

The modulator 116 provides an output $X_{cm}$ which may similarly be represented by the following equations:

$$X_{cm}=A_m \sin \phi_{k-2} \sin(\omega_p t+\phi_{k-1}) \qquad (28)$$

which when expanded through the use of a trigonometric identity is, $$X_{cm}=\frac{A_m}{2}[\cos(\omega_p t+\phi_{k-1}-\phi_{k-2})-\cos(\omega_p t+\phi_{k-1}+\phi_{k-2})] \qquad (29)$$

The phase of the output $X_{sm}$ is advanced by 45° ($\pi/4$) by a phase shifter 122 while the phase of the output $X_{cm}$ is retarded by 45° ($-\pi/4$) by a similar phase shifter 124. The phase shifted outputs $X_{cm}$ and $X_{sm}$ may be represented by the following equations:

$$X_{cm}=\frac{A_m}{2}[\sin(\omega_p t+\phi_{k-1}-\phi_{k-2}+\pi/4)(-\pi/4)-\sin(\omega_p t+\phi_{k-1}+\phi_{k-2}+\pi/4)] \qquad (30)$$

$$X_{sm}=\frac{A_m}{2}[\sin(\omega_p t+\phi_{k-1}+\phi_{k-2}+\pi/4)(+\pi/4)+\sin(\omega_p t+\phi_{k-1}-\phi_{k-2}+\pi/4)] \qquad (31)$$

Linear addition of these phase shifted outputs as may be accomplished in an adder circuit 126 results in a signal at the processing frequency which is a function of the differential phase shift between the $S_{mt}$ and $S_{nt}$ tones and as will be observed from the following equation:

$$X_{cm}+X_{sm}=A_m \sin[\omega_p t+(\phi_{k-1}-\phi_{k-2})+\pi/4](-\pi/4)(+\pi/4) \qquad (32)$$

Phase shifters 128 and 130, similar to the phase shifters 122 and 124 respectively, and an adder circuit 132 similar to the adder circuit 126 which operates on the outputs $X_{so}$ and $X_{co}$ of the modulators 118 and 120, provide an output which is similar in form to the output of the adder 126 and thereby represents the differential phase shift between the $S_{nt}$ and $S_{ot}$ tones. This output is represented in the following equation:

$$X_{co}+X_{so}=A_o \sin[\omega_p t+(\phi_{k-1}-\phi_k)+\pi/4](-\pi 4)(+\pi/4)=A_o \sin[\omega_p t-(\phi_k-\phi_{k-1})+\pi/4] \qquad (33)$$

As will be observed from Equations 17 and 18, this differential phase shift represents the information as will be transmitted. It will be appreciated, of course, that $\Delta\phi_{k-1}$ is also equal to $\Delta\oplus_{k-1}$. It will be noted, of course, that the differential phase shift $\Delta\phi_{k-1}$ is inverted (i.e., is the negative of the angle rather than the angle itself). This invention may readily be accommodated in the decision logic, as will become apparent as the description proceeds.

Figure 5:
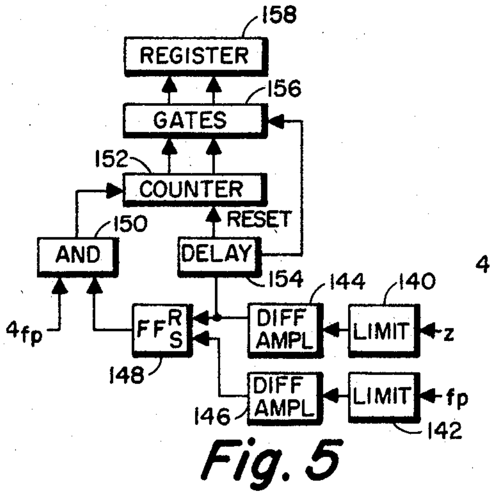
FIG. 5 is a block diagram which illustrates one embodiment of the decision logic of the receiver portion of the system.
Figure 6:
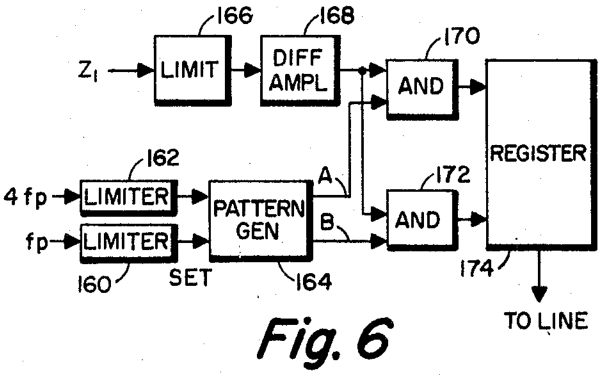
FIG. 6 is a block diagram which illustrates another embodiment of the decision logic of the receiver portion of the system.

Filters 134 and 136 similar to the filter 110 remove unwanted frequency components from the adder outputs and respectively provide information outputs $Z_1$ and $Z_2$ which are presented to the decision logic systems, different embodiments of which are illustrated in FIGS. 5 and 6.

The recovery system is readily adapted to diversity combining. The output of a diversity channel, similar to the channel which recovers the $Z_1$ output may be added into the adder 126 output. Similarly, a diversity channel which recovers the $Z_2$ output may be added to the adder 132 output.

Referring first to FIG. 5, a decision logic system is shown which derives the binary bits $X_1$ and $X_2$ which is represented by the $Z_1$ output from the filter 134. Another similar system may be used to derive the bits $X_3$ and $X_4$ from the $Z_2$ output. This system, effectively, compares the phase of the $Z_1$ output which, as will be recalled, is a function of the processing frequency signal $f_p$ with the unmodulated processing signal which is derived from the frequency synthesizer 66. Both the $Z_1$ output and the $f_p$ signal are limited to provide a square wave by means of limiter circuits 140 and 142, respectively. The square wave outputs from the limiters 140 and 142 are respectively applied to differentiating amplifiers 144 and 146, which differentiate these signals and extract a pulse coincident with the positive-going or leading edge thereof. This positive leading edge corresponds to the zero-crossovers of these $Z_1$ and $f_p$ signals.

A flip-flop 148 is set by the pulse, corresponding to the zero cross-over of the processing signal $f_p$, thereby producing an output level which enables an AND gate 150. The AND gate 150 passes output pulses at frequency $4f_p$, which may be obtained from the synthesizer 66, to a counter 152. The counter and the flip-flop are reset by the pulse at the $Z_1$ output zero cross-over; the counter being reset after a delay interposed by a delay circuit 154. The counter 152 itself may be a two flip-flop binary counter which can count up to four and represent this count by two bits which correspond to the pair of bits represented by the $Z_1$ output, viz. $X_1$ and $X_2$ (see FIG. 1). Each pulse from the $4f_p$ signal corresponds to a different quadrant of the $f_p$ signal. It will be apparent from FIG. 2 that a count of one pulse from the source at $4f_p$ represents $X_1$ and $X_2$ bits of "0," "0"; a count of two pulses represents "0," "1"; a count of three pulses represents "1," "1" and four pulses "1," "0." Thus the number of pulses which are counted by the counter until occurrence of the output pulse from the differentiating amplifier 144, which corresponds to the $Z_1$ zero cross-over, represents the values of the $X_1$ and $X_2$ bits. Just prior to counter reset, as may be accomplished by providing a slightly shorter delay in the delay circuit 154, transfer gates 156 are enabled so that the count registered in the counter may be transferred to a register 158. This register may be a multi-bit register having stages for storing the bits corresponding to the $Z_1$ output, as well as the $Z_2$ output and other outputs of the recovery system, if any. This register may be readout into a line at the receiving point by pulses having a frequency equal to $qf_{br}$ where $q$ is the ratio of the rate at which data is transmitted (total number of bits per second) to the total number of symbol bits per second. In the illustrated system, $q$ is equal to 4 and $qf_{br}$ is equal to 100 pulses per second.

FIG. 6 illustrates another decision logic system for deriving the binary bits which are represented by the $Z_1$ output signal during each symbol interval. As the description proceeds, it will be observed that this embodiment lends itself to more accurate control of the accuracy of the decision process and may be more suitable than the embodiment illustrated in FIG. 5. The processing frequency signal of $f_p$ and $4f_p$ from the synthesizer 66 are both limited in limiter circuits 160 and 162, which translate these signals into square waves. The square wave signals are applied to a pattern generator 164, which generates a pair of output square waves at frequency $f_p$ phase displaced 90° with respect to each other. These signals are indicated as wave forms A and B in FIG. 4.

The pattern generator may include a pair of flip-flops which divide the signals of $4f_p$ first into a square wave of frequency $2f_p$ and then another square wave of frequency $f_p$ in order to produce wave form A. Wave form B is generated in the pattern generator 164 by means of another flip-flop which is triggered by an output from the first divider in the pair of flip-flops which produced wave form A. A triggering pulse for the wave form B generator flip-flop may be obtained in response to a negative-going edge of the square wave from the first of the pair of flip-flops which provide wave form A. The positive going edge of the output pulse from that first flip-flop will be used to trigger the second of the pair of divider flip-flops which provide wave form A. The flip-flops of the pattern generator 164 are all set by the positive-going edge of the square wave from the limiter 160. Accordingly, the phase relationship of the pattern will be locked to the time base.

Figure 4:
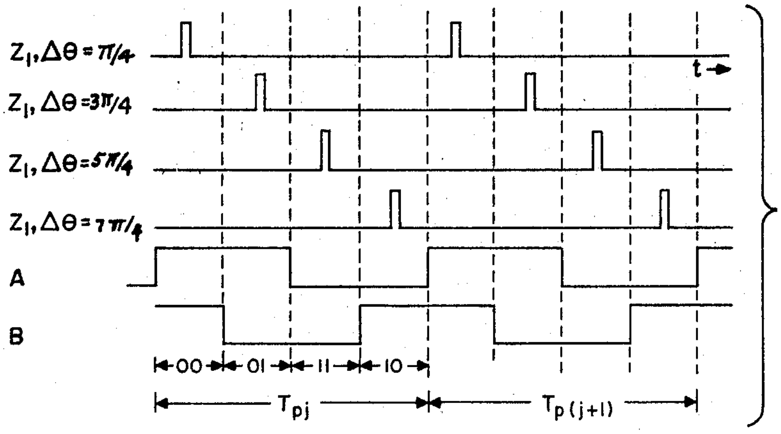
FIG. 4 is the family of waveforms which illustrate the operation of decision logic of the receiver portion of the system embodying the invention.

The $Z_1$ output is limited in a limiter 166. A pulse corresponding to the positive-going cross-over of the $Z_1$ output is generated by a differentiating amplifier 168. Because of the $\pi/4$ displacement in the recovery networks (see Equations 32 and 33) the output pulses from the differentiating amplifier will ocur centrally in any of the four quadrants of the $f_p$ signal. The output pulses from the amplifier 168 which correspond to these four possible positions are illustrated in the wave form diagram of FIG. 4. The binary bits which correspond to these four phase positions for $T_{pj}$, which is the period of the processing frequency, is also illustrated in FIG. 4. It will be noted that during the quarter cycle, when both the wave forms A and B are at high level, each will correspond to a "0" output bit. In the next quarter cycle, the wave form A is at high level while the wave form B is at low level. The wave forms A and B then will respectively correspond to "0" and "1" bits. A pair of AND gates, 170 and 172, are provided for transmitting levels corresponding to these wave forms when enabled by the $Z_1$ output pulse from the differentiating amplifier 168. The AND gate outputs are applied to different flip-flop stages of a register 174. Accordingly, if the $Z_1$ pulse occurs in the first quadrant and respresent $X_1$ and $X_2$ bits having "0" values, high level signals will be gated through the AND gates 170 and 172, which will set the $X_1$ and $X_2$ bit stages of the register to represent "0" bits. Similarly, if the $Z_1$ pulse occurs in the second quadrant, the $X_1$ stage of the register will be set by the output of the AND gate 170 to represent a "0" bit, while the $X_2$ stage of the register will be set by the output of the AND gate 172 to represent a binary "1" bit. The cycle is repeated for each period of the processing frequency. The next successive period $T_p(j+1)$ is illustrated in FIG. 4. In the case of the $Z_2$ output, where the recovered differential phase shift is the negative of the transmitted modulation, the pattern generator 164 outputs may be taken from the other sides of the output flip-flops thereof so that the pattern shown in FIG. 4 is reversed. The levels will then represent the output bits corresponding to the negative phase angle which is recovered.

Figure 7:
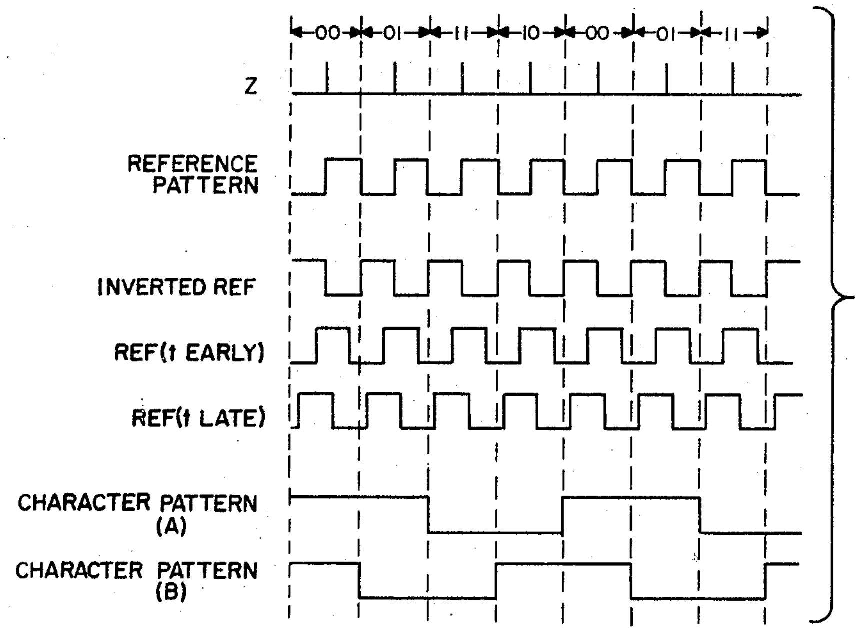
FIG. 7 is a family of waveforms which illustrates the operation of a synchronizing system which may be included in the receiver portion of the system.
Figure 8:
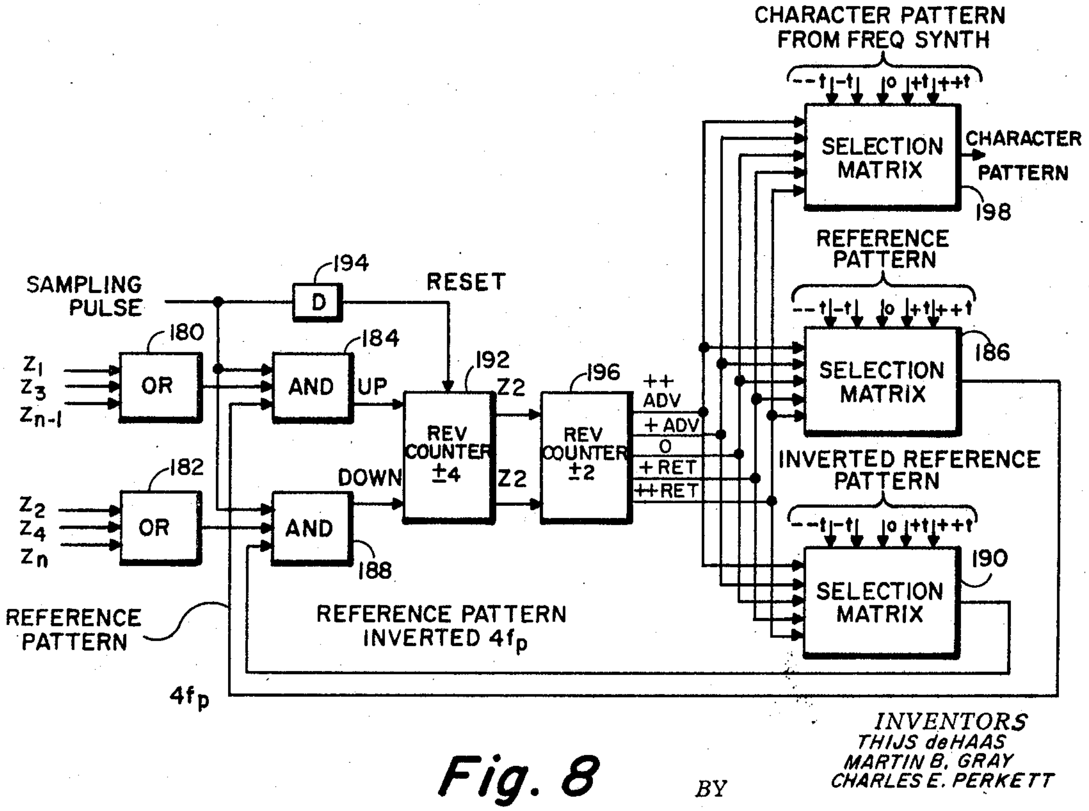
FIG. 8 is a block diagram of the synchronizing system.

FIGS. 7 and 8 illustrate a system for synchronizing the processing signal ($f_p$) with the time base of the transmitter $f_{bt}$. It will be recalled that the processing frequency is synchronized with the receiver time base $f_{br}$, since both the receiver time base and the processing frequency are derived by the frequency synthesizer from the same frequency standard. In as much as the transmitter time base and the receiver time base are synchronized with each other by means of the synchronizing circuit 68, the processing frequency will be at least coarsely synchronized with the transmitter time base. Such coarse synchronization may be entirely suitable for many communications systems purposes. The synchronizing system illustrated in FIGS. 7 and 8 may be used to provide fine synchronization, however, when desired.

The input signals to the synchronizing system, as shown in FIG. 8, are the Z pulses which are derived from the decision logic (e.g. from a differentiating amplifier such as the differentiating amplifier 168 (FIG. 6) used to obtain the $Z_1$ pulse). In general, any number ($n$) of Z pulses may be obtained from the system. In a typical system, eight Z pulses may be obtained. These pulses represent the detected differential phase angles transmitted in each of the channels with respect to the local processing frequency $f_p$. In order to reduce the probability of time coincidence, and to make use of the fact that the sense of an error in the phase position of the odd Z outputs is opposite to the sense of such error in the position of the even Z outputs, odd and even Z outputs are divided into different groups and combined by means of different OR gates 180 and 182. The combined outputs of the odd Z signals is applied to an AND gate 184, together with a reference pattern of frequency $4f_p$, obtained from the frequency synthesizer 66 via a selection matrix 186, the operation of which will be explained hereinafter. The reference pattern of frequency $4f_p$, but inverted in polarity, is applied to another AND gate 188, together with the combined pulses due to the even Z outputs which are obtained from the OR gate 182. The latter inverted reference pattern is also obtained from the frequency synthesizer 66 by way of another selection matrix 190.

The wave forms of one Z pulse and of the reference pattern and inverted reference pattern are illustrated in FIG. 7.

It will be observed from these wave forms that the theoretical position of the Z pulse for a perfect unperturbed channel is coincident with the transitions of the reference pattern. A lag in the occurrence of any of the odd Z pulses ($Z_1$, $Z_3$ and $Z_{n-1}$) will result in a Z pulse which is coincident with the high level side of the reference pattern. Similarly a lead in the occurrence of any of the even Z pulses will result in a pulse which is coincident with the high level side of the inverted reference pattern. The AND gates are enabled during each time base period by a sampling pulse having the duration of the receiver time base frequency $f_{br}$. The gates then produce output pulses depending upon coincident relationships of the odd Z pulses in the case of the gate 184 and of the even Z pulses in the case of the gate 188 with the reference pattern and the inverted reference pattern, respectively. A lag in the occurrences of any of the odd Z pulses, therefore, results in a count-up input pulse to a reversible counter 192, while a lead in the occurrences of any of the even Z pulses results in a count-down input to the counter 192. The counter 192 is reset at the end of each time base period by a pulse which occurs a short time after the end of the time base period. This pulse may be generated by a delay generator 194, which responds to the positive-going or leading edge of the sampling pulse of frequency $f_{br}$. At the end of the sampling period the state of the counter indicates the number of Z pulses which were displaced from the time position in which they theoretically should occur and the sense (lead or lag) of such displacement. Thus the count stored in the counter 192 indicates the direction in which the receiver time base should be corrected in order to provide more accurate synchronization with the transmitter time base.

Outputs are obtained from the counter 192 at the end of a sampling period when the counter is reset on one line when the count is equal or greater than two and on the other line for a count less than two. These outputs are applied to a second reversible counter 196, which acts as a storage device. In the event that a communication system uses several groups of channels, each of which provides a number of Z pulses, each group may include a system such as shown in FIG. 8 and a storage counter such as the counter 196. Correction circuits such as circuits for inserting or deleting pulses from the chain of dividers in the frequency synthesizer 66 which produces the receiver time base frequency $f_{br}$ may be controlled in response to the count stored in the counter 196, in order to provide extremely fine synchronization of the receiver time base with respect to the transmitter time base.

The reversible counter 196 provides outputs to the selection matrices 186 and 190 and to another selection matrix 198 which receives a character pattern such as may be produced by a pattern generator 164 (FIG. 6) and which pattern is used to derive the digital information pulses, as was explained in connection with FIG. 6. Each of these selection matrices is provided with five groups of patterns, one occurring at a normal or ideal time position with reference to the receiver time base and the others occurring earlier or later with respect thereto. The earlier-occurring patterns are indicated as $+t$ and $++t$, while the later occurring time patterns are indicated as $-t$ and $--t$.

Whenever a systematic phase error exists, the storage counter 196 will store a positive or negative count, depending upon the sense of the phase error. When no count is stored, a zero output is produced which enables the selection matrices (the latter may be diode matrices) so that they provide the output patterns having normal time position (phase zero time position). On the other hand, if the counter 196 is stepped to its $+1$ or $-1$ position, outputs are produced either on the $+$ advance output line or the $+$ retard output line which enable the selection matrices 186, 190 and 198 to provide patterns having one unit of time displacement. If this displacement is sufficient to correct a phase error, the counter 196 will remain in its $+1$ position since the reference pattern and the inverted reference pattern, which are correspondingly advanced or delayed by one unit of time, are compared with the Z pulses, and the probability of the reversible counter 192 reaching a higher count is very small. If the phase error is substantially greater, the storage counter 196 will be stepped to either its $+2$ or $-2$ position, and the selection matrices 186, 190 and 198 will select the patterns having two units of lead or lag (viz, $++t$ or $--t$). Any change in the systematic phase error will result in a change in the count stored in the storage counter 196, thereby resulting in the selection of different character and reference patterns, such that the system remains in synchronism. Since the character pattern is synchronized with the receiver time base, the likelihood of errors due to imperfect synchronism is considerably reduced. The wave forms of FIG. 7 may be referred to for a showing of typical early or late reference pulses, as may be produced by the selection matrix 186. The time relationship between the reference and character patterns will also be apparent from FIG. 7.

From the foregoing description it will become apparent that there has been designed a communication system which is especially adapted to provide accurate and simplified means for the recovery of information as may be conveyed by a progressively phase shifted keyed frequency differential modulation process. It will be appreciated, however, that other communications systems may find use for the invention, and that variations and modifications in the herein-described system within the scope of the invention will undoubtedly occur to those skilled in the art. Accordingly, the foregoing description should be taken merely as illustrative and not in any limiting sense.

What is claimed is:

1. A communications system in which information is transmitted from a transmitting point to a receiving point in accordance with the phase difference between different elements of a signal, said system comprising (a) means at said receiving point for deriving outputs which are functions of the phase displacement of said different elements, (b) means for phase modulating a processing signal in accordance with the one of said outputs to produce a modulated processing signal, (c) means for modulating said modulated processing signal in accordance with the other of said outputs for providing a modulated processing signal which is phase modulated in accordance with said phase difference between said different signal elements, and (d) means responsive to the phase relation between the modulated signal produced by said last named means and said processing signal for deriving said information.

2. The invention as set forth in claim 1 wherein correlation detection means are included in said means for deriving said outputs.

3. A communications system in which a plurality of tones, the phase relationship between different ones of which is modulated in accordance with the information to be communicated, is transmitted from a transmitting point to a receiving point, said system comprising
(a) means at said receiving point responsive to said tones for deriving outputs which are functions of the phase modulation of a different ones of said tones,
(b) means responsive to the output produced by said last named means which is a function of the phase modulation of one of said plurality tones for providing an output signal which is phase modulated in accordance therewith,
(c) means responsive to the outputs produced by said first named means which are functions of the phase modulation of each of the other of said plurality of tones and said output signal for providing other output signals each of which is phase modulated in accordance with the phase difference between said one tone and different ones of said other of said plurality of tones, and
(d) means responsive to the phase modulation of said other output signals for deriving said information therefrom.

4. The invention as set forth in claim 3 wherein the element defined in subparagraph (a) comprises correlation detection means for deriving said outputs which are sine and cosine functions of the phase displacement of different ones of said tones, and wherein the element defined in subparagraph (b) comprises means for separately multiplying said sine and cosine outputs corresponding to the phase displacement of said one tone separately with a processing signal of frequency higher than of said one tone and to derive the products of such multiplication and means for producing the sum of said products for providing said output signal.

5. The invention as set forth in claim 3 wherein the element set forth in subparagraph (a) comprises correlation detection means for deriving said outputs which are sine and cosine functions of the phase displacements of different ones of said tones, and wherein the element set forth in subparagraph (c) comprises means for multiplying said sine and cosine outputs corresponding to each of said other of said plurality of tones and said output signal to derive the products of such multiplications, and means for producing the sum of said products for providing said other output signals.

6. The invention as set forth in claim 3 wherein said phase relationship is any of a plurality of discrete phase displacements each representing a different information symbol, and wherein the element set forth in subparagraph (d) comprises means for generating a pulse train having a frequency equal to *n* times the frequency of said output signals where *n* is the number of said discrete phase displacements per period of said tone, and means for counting the number of pulses of said train which occur between said output signal prior to the phase modulation thereof and said each of said other output signals.

7. The invention as set forth in claim 3 wherein said phase relationship is any one of a plurality of discrete phase displacements each representing a different symbol of said information and wherein the element set forth in subparagraph (b) comprises means for modulating said output with a processing frequency signal to provide said output signal, and further wherein the element set forth in subparagraph (d) comprises means for generating a wave having a different pattern corresponding to each of said discrete phase displacements of said processing frequency signal, and means responsive to said other output signals for representing said symbol in accordance with the one of said patterns corresponding most closely to the phase displacement of each of said other output signals.

8. The invention as set forth in claim 7 wherein said wave generating means provides a plurality of character waves each corresponding to a different bit of digital information representing said symbol, said waves having in each of said discrete phase displacement portions of each period of said processing frequency signal, a different combination of levels, means responsive to said output signals for providing a pulse having a time position during each cycle thereof which represents the phase state thereof, an output register, and means enabled by said output pulse for gating said character waves into said register whereby to store therein the digital information represented by the phase state of said output signals.

9. The invention as set forth in claim 3 further comprising a system for correcting variations in the phase of said transmitted tones when said tones are transmitted with a plurality of discrete admissible phase shifts during each period thereof, said correcting system comprising means responsive to each of said other output signals for providing a plurality of output pulses corresponding to the phase states of different ones thereof, means for generating a reference pattern having a frequency equal to the number of admissible phase states of said output signals during each period thereof, means for comparing said reference pattern and said pulses with each other for deriving an error output which represent the sense of the average phase displacement of said other output signals from the admissible phase states and means for controlling the phase of said reference pattern produced by said generating means in accordance with said error output.

10. The invention as set forth in claim 8 further comprising a system for correcting variations in the phase of said transmitted tones when said tones are transmitted with a plurality of discrete admissible phase shifts during each period thereof, said correcting system comprising means responsive to each of said other output signals for providing a plurality of output pulses comprising to the phase states of different ones thereof, means for generating a reference pattern having a frequency equal to the number of admissible phase states of said output signals during each period thereof, means for comparing said reference pattern and said pulses with each other for deriving an error output which represents the sense of the average phase displacement of said other output signals from their admissible phase states, means for controlling the phase of said reference pattern produced by said reference pattern generating means in accordance with said error output, and means for controlling the phase of said waves generated in said character pattern generating means in accordance with the sense and magnitude of said error output provided by said correcting system.

No references cited.

ROBERT L. GRIFFIN, *Primary Examiner.*

WILLIAM S. FROMMER, *Assistant Examiner.*

U.S. Cl. X.R.

179—111; 325—30, 47, 59, 60, 20; 328—133; 340—170